(12) United States Patent
Moxon et al.

(10) Patent No.: US 12,481,811 B1
(45) Date of Patent: Nov. 25, 2025

(54) CIRCUIT DESIGN MODIFICATION BASED ON TIMING TRADEOFF

(71) Applicant: Cadence Design Systems, Inc., San Jose, CA (US)

(72) Inventors: Jordan Moxon, Mountain View, CA (US); Kwangsoo Han, Austin, TX (US); Zi Wang, Dallas, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 620 days.

(21) Appl. No.: 18/075,109

(22) Filed: Dec. 5, 2022

(51) Int. Cl.
  *G06F 30/327* (2020.01)
  *G06F 30/3312* (2020.01)
  *G06F 119/06* (2020.01)
  *G06F 119/12* (2020.01)

(52) U.S. Cl.
  CPC ........ *G06F 30/327* (2020.01); *G06F 30/3312* (2020.01); *G06F 2119/06* (2020.01); *G06F 2119/12* (2020.01)

(58) Field of Classification Search
  CPC ............... G06F 30/327; G06F 30/3312; G06F 2119/06; G06F 2119/12
  USPC ........................................................ 716/104
  See application file for complete search history.

(56) References Cited

U.S. PATENT DOCUMENTS

| | | | | |
|---|---|---|---|---|
| 7,114,136 B2* | 9/2006 | Chase | ................. | G06F 30/3312 324/501 |
| 7,373,621 B1* | 5/2008 | Dastidar | ................ | G06F 11/263 716/117 |
| 7,647,220 B2* | 1/2010 | Kulshreshtha | .......... | G06F 30/33 716/108 |
| 8,239,798 B1* | 8/2012 | Goyal | ................. | G06F 30/3312 716/113 |
| 8,245,165 B1* | 8/2012 | Tiwary | ................ | G06F 30/3312 716/108 |
| 8,578,312 B2* | 11/2013 | Papanikolaou | ......... | G06F 30/30 716/110 |
| 8,661,394 B1* | 2/2014 | Frederick | ................ | G06F 30/34 716/126 |
| 8,863,052 B1* | 10/2014 | Dhuria | .................. | G06F 30/367 716/108 |
| 10,783,300 B1* | 9/2020 | Singh | .................. | G06F 30/3315 |
| 11,741,282 B2* | 8/2023 | Nath | .................... | G06F 30/3315 716/110 |
| 2005/0198606 A1* | 9/2005 | Gupta | ............ | G01R 31/318314 716/104 |
| 2008/0133202 A1* | 6/2008 | Tseng | .................... | G06F 30/367 703/14 |
| 2008/0216035 A1* | 9/2008 | Dirks | .................. | G06F 30/3312 703/19 |

(Continued)

FOREIGN PATENT DOCUMENTS

EP 2006784 A1 * 12/2008 ......... G06F 30/3312

*Primary Examiner* — Suresh Memula
(74) *Attorney, Agent, or Firm* — Schwegman Lundberg & Woessner, P.A.

(57) ABSTRACT

Various embodiments provide for modifying a circuit design based on timing tradeoff, which can be part of an electronic design automation (EDA) system. For instance, some embodiments use a return on investment (ROI) concept to determine one or more thresholds for how much area or power of a circuit design should be available for use (e.g., sacrificed) in order to obtain an improvement in slack by a given transformation.

20 Claims, 8 Drawing Sheets

(56) References Cited

U.S. PATENT DOCUMENTS

| | | | |
|---|---|---|---|
| 2009/0106724 A1* | 4/2009 | Arsovski | G06F 30/396 |
| | | | 716/115 |
| 2010/0169846 A1* | 7/2010 | Gupta | G06F 30/36 |
| | | | 716/52 |
| 2012/0017189 A1* | 1/2012 | Durbha | G06F 30/337 |
| | | | 716/113 |
| 2012/0239371 A1* | 9/2012 | Tehrani | G06F 30/367 |
| | | | 716/113 |
| 2014/0245245 A1* | 8/2014 | Gupta | G06F 30/398 |
| | | | 716/112 |
| 2015/0199465 A1* | 7/2015 | Alpert | G06F 30/392 |
| | | | 716/122 |
| 2023/0110560 A1* | 4/2023 | Shen | G06F 30/367 |
| | | | 716/113 |

* cited by examiner

CIRCUIT DESIGN MODIFICATION BASED ON TIMING TRADEOFF

TECHNICAL FIELD

Embodiments described herein relate to circuit design and, more particularly, to systems, methods, devices, and instructions for modifying a circuit design based on timing tradeoff, which can be part of electronic design automation (EDA).

BACKGROUND

To optimize resistor-transfer logic (RTL) synthesis, EDA systems can evaluate multiple transformations (e.g., local transforms) to the logic or tech mapping of a circuit design to identify a better or best global solution for a final version of the circuit design. When evaluating such transformations, an EDA system often has to choose whether to accept a transform that improves one or more of power, timing, or area of the circuit design, while degrading one or more of the others.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
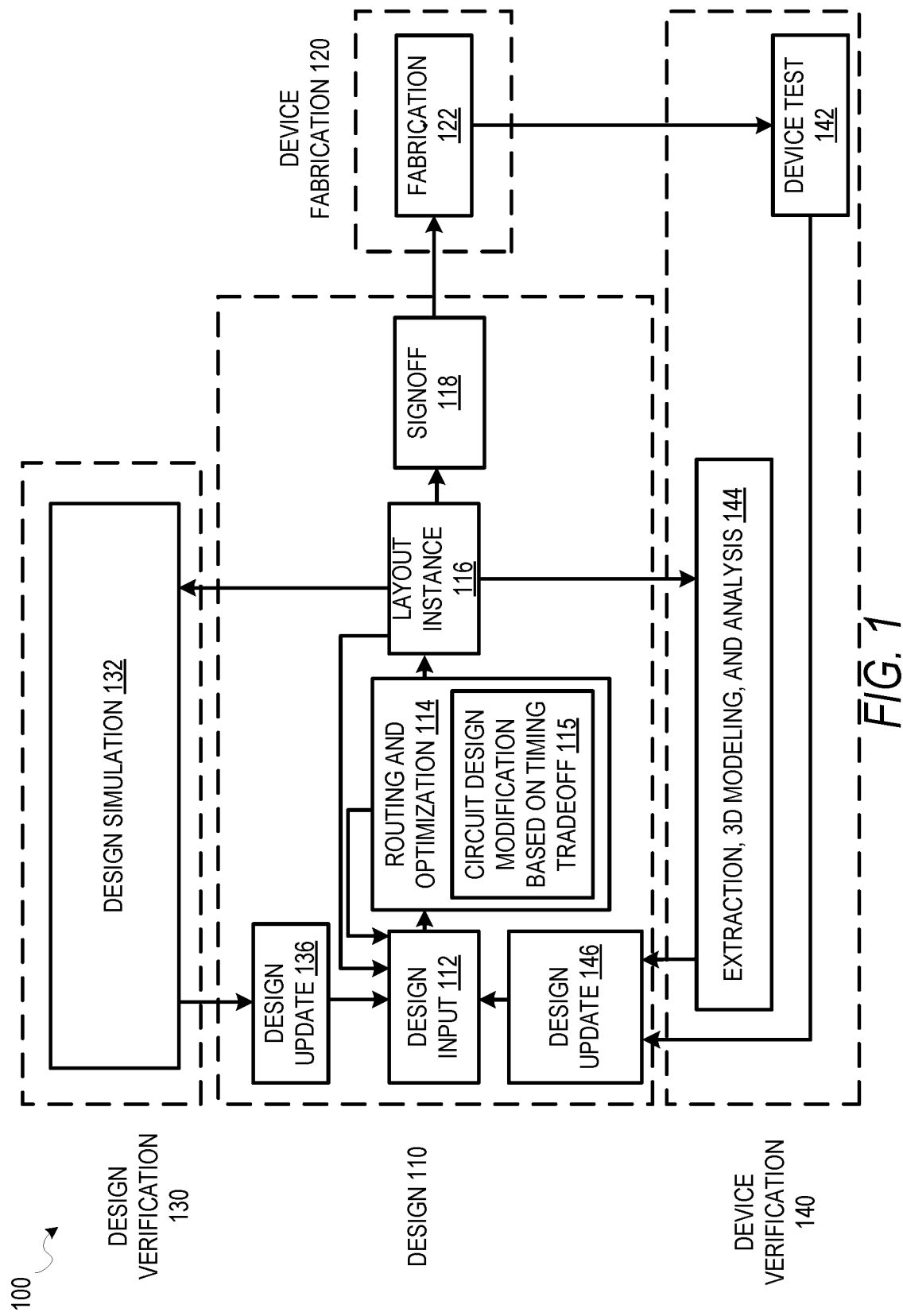
FIG. 1 is a diagram illustrating an example design process flow for modifying a circuit design based on timing tradeoff, according to some embodiments.

Various embodiments provide for modifying a circuit design based on timing tradeoff, which can be part of an EDA system. In particular, various embodiments described herein use a return on investment (ROI) concept to determine (e.g., set) one or more thresholds for how much area or power of a circuit design should be available for use (e.g., sacrificed) in order to obtain an improvement in slack by a given transformation (e.g., by how much can area usage within a local area or local region be increased in order to improve local slack by a local transformation), while taking into account local timing information from before the given transform. According to some embodiments, a given transform is evaluated using a model (e.g., timing-aware tradeoff model) that determines (e.g., dynamically chooses) a threshold value based on ROI, where the model is more permissive to transforms (e.g., local transforms) for timing improvements on logic paths that have more constrained timing (e.g., large native slack relative to the determined threshold) and less permissive to transforms on logic paths that have less constrained timing (e.g., small negative slack relative to the determined threshold). Slack can be regarded as highly constrained if, for example, a delay along a path is more than a clock period. By use of such a model, an embodiment can select (e.g., identify) potential transforms (e.g., local circuit optimization transforms) for a circuit design that transition between a threshold of a demanding ratio of gain-to-cost, to a more permissive ratio of gain-to-cost, depending on a slack value of the circuit design (e.g., the local slack value of a local area of the circuit design).

The timing-aware (e.g., timing-driven) model of some embodiments uses local timing conditions to ensure one or more local transformations that implement aggressive slack optimizations are chosen when they are needed without unnecessarily sacrificing area of or power consumption by a circuit design. An embodiment described herein can work with one or more processes that determine (e.g., identify or generate) candidate transforms that target timing, and the use of the timing-aware tradeoff model can ensure that transforms (e.g., local transforms) consistently improve the most constrained areas (e.g., time constrained parts or portions) of a circuit design.

As used herein, a local area (or local region) of a circuit design can correspond to a subset of a netlist of the circuit design. As used herein, a local transformation can comprise a transform applied to a netlist within a local area of circuit design. A local transform applied to an area of a circuit design can improve a design quality or characteristic of the circuit design in that area, such as area usage, power usage, or timing (e.g., improve slack). As used herein, slack, slack value, or slack timing can refer to a margin value by which a timing requirement of a circuit design is met or not met. For instance, a positive slack can indicate a margin value by which a requirement is met, while a negative slack can indicate a margin value by which a requirement is not met. Local slack can refer to a margin value by which a timing requirement of a local area of a circuit design is met or not met.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for modifying a circuit design based on timing tradeoff, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. As shown, the routing and optimization 114 operation includes a circuit design modification based on timing tradeoff 115 operation (hereafter, modification 115 operation), which may be performed in accordance with various embodiments described herein. The modification 115 operation can evaluate application of a given transform (e.g., local transform with respect to a local area of the circuit design) using a model (e.g., timing-aware tradeoff model) that determines (e.g., dynamically chooses) a threshold value based on ROI. The model causes some embodiments to be more permissive of transforms (e.g., cause the embodiment to evaluate and accept transforms) for timing improvements on logic paths that have more constrained timing (e.g., large native slack relative to the determined threshold), and to be less permissive to transforms (e.g., cause the embodiment to evaluate and reject transforms) on logic paths that have less constrained timing (e.g., small negative slack relative to the determined threshold). More regarding how the modification 115 operation can be performed is described herein with respect to FIGS. 2 and 3.

While the design process flow 100 shows optimization occurring prior to a layout instance 116, routing, timing analysis and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, three-dimensional (3D) modeling, and analysis 144 operations. Once the device is generated, the device can be tested as part of device test 142 operations and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
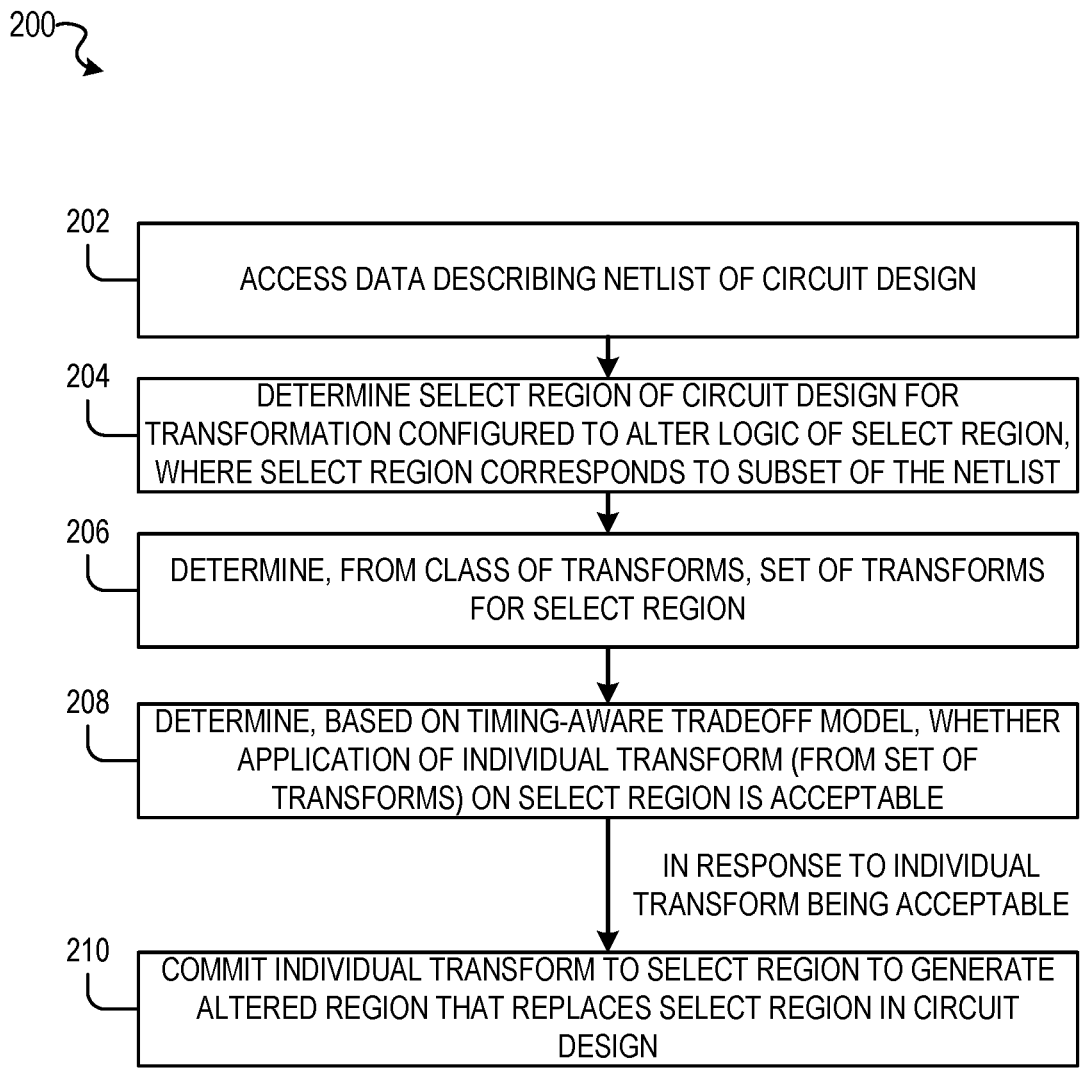
FIGS. 2 and 3 are flowcharts illustrating example methods for modifying a circuit design based on timing tradeoff, according to some embodiments.
Figure 3:
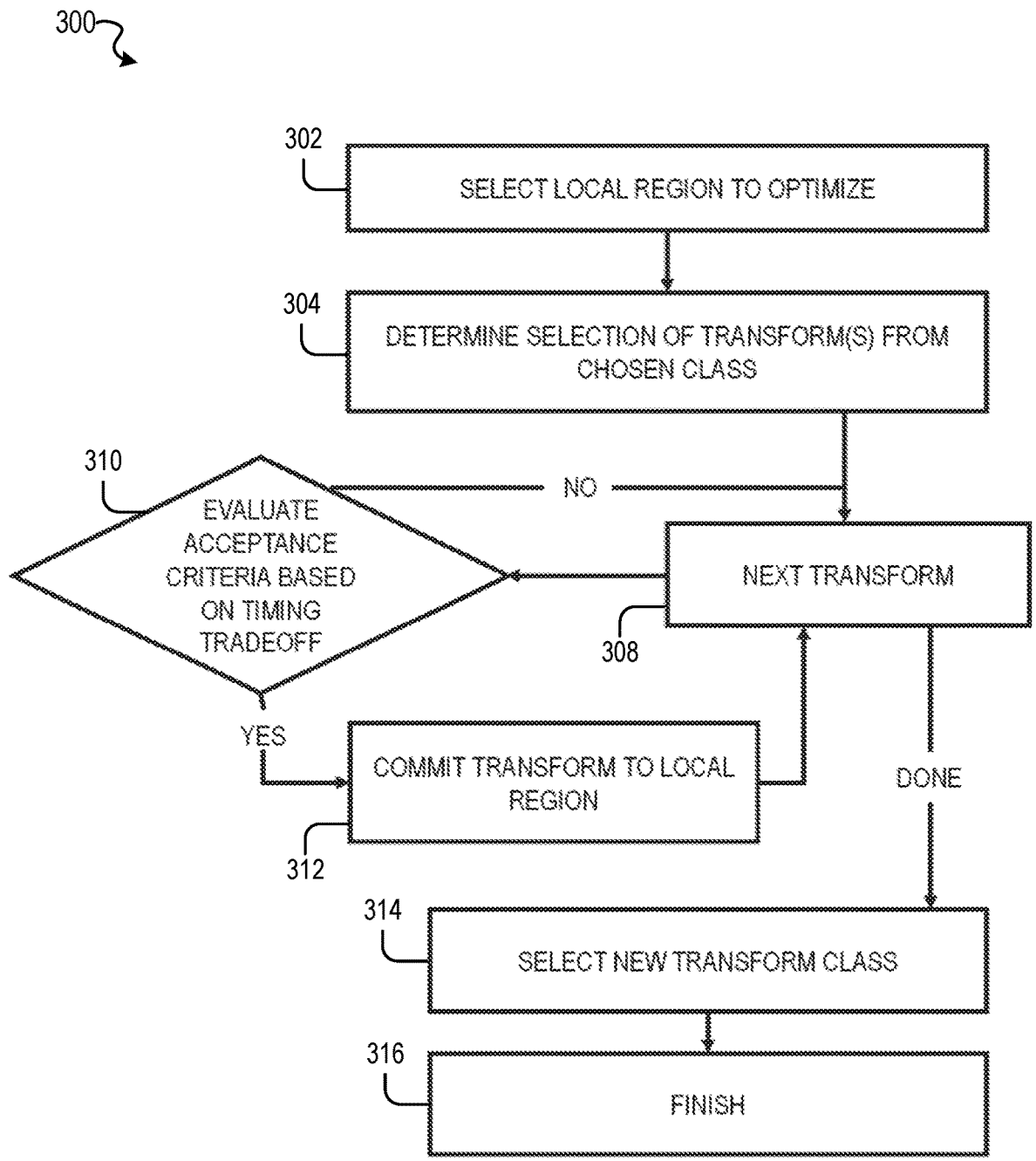

FIGS. 2 and 3 are flowcharts illustrating example methods for modifying a circuit design based on timing tradeoff, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a hardware processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. Depending on the embodiment, the method 200 can be performed after, or as part of, a timing analysis process performed on a circuit design.

Referring now to FIG. 2, operation 202 accesses data that describes a netlist of a circuit design. The circuit design can comprise one or more nets that have components, such as cell instances (e.g., AND gates, OR gates, NAND gates, NOR gates, XNOR gates, etc.), that are operatively coupled together by way of paths and implement logic of the circuit design.

At operation 204, a select region (e.g., local area) of the circuit design is determined (e.g., selected) for a transformation (e.g., local transformation), where the transformation is configured to alter a logic of the select region, and where the select region corresponds to a subset of the netlist (e.g., local area of the circuit design). The subset of the netlist can represent sublogic of the circuit design.

Thereafter, at operation 206, a set of transforms is determined (e.g., selected or identified), from a class of transforms, for the select region. An individual transform in the set of transforms can comprise a local transform, which can limit changes to local changes to the select region (e.g., changes only netlist elements within the select region, and no changes outside the select region). Accordingly, an individual transform (e.g., individual local transform) can implement changes or alterations that locally impact (e.g., optimize) area usage (e.g., lowers area usage) by the select region, timing (e.g., improves slack) of the select region, power consumption (e.g., lowers power usage) by the select region, or some combination thereof.

For some embodiments, operation 206 is performed for each class of transforms, where a set of transforms is determined for each class of transforms. Additionally, for some embodiments, operations 208 and 210 can be performed for each individual transform of the set of transforms. In doing so, various embodiments can iteratively consider numerous different classes of transforms for the select region. From operation 206, the method 200 proceeds to operations 208 and 210, which are performed with respect to an individual transform in the set of transforms determined by operation 206. For instance, an embodiment can perform operations 208 and 210 for each individual transform in the set of transforms determined by operation 206.

Operation 208 determines (e.g., evaluates), based on a timing-aware tradeoff model, whether application of the individual transform on the select region is acceptable. By operation 208, an embodiment can determine whether the individual transform should be accepted or rejected based on information from the select region and timing of the local input/output ports of the select region. According to some embodiments, the timing-aware tradeoff model is configured to evaluate (e.g., evaluate conditions for accepting or rejecting an individual transform) transforms based on a constrained timing arc of the select region.

For some embodiments, the timing-aware tradeoff model is configured to be more permissive to transforms (e.g., local transforms) for timing improvements on the select region (e.g., logic paths of the select region) that have more constrained timing (e.g., large native slack relative to the determined threshold), and less permissive to transforms on the select region that have less constrained timing (e.g., small negative slack relative to the determined threshold). In other words, the timing-aware tradeoff model can cause an embodiment to favor timing when slack is highly constrained (e.g., large negative values), and can cause an embodiment to favor area usage, power consumption, or both when slack is permissive (e.g., small negative or positive values). As a result, an embodiment can cause acceptance of transforms (e.g., local transform) that improve slack (e.g., at a cost of higher power consumption or higher area usage) in a select region having paths with a highly constrained timing arc, and can cause acceptance of transforms that improve power consumption or area usage (e.g., at the cost of degrading slack) by a select region when the select region has paths without a highly constrained timing arc. For example, the timing-aware tradeoff model can be configured to prioritize transforms that improve slack in a select region when a constrained timing arc of the select region (e.g., of paths in the select region) is determined to be high based on a threshold value.

The timing-aware tradeoff model can be configured to prioritize transforms that lower power consumption by a select region (e.g., by paths and components within the select region) when the constrained timing arc of the select region (e.g., of paths in the select region) is determined to be low based on a threshold value. Additionally, the timing-aware tradeoff model can be configured to prioritize transforms that reduce area of the circuit design occupied by the select region (e.g., occupied by paths and components in the select region) when the constrained timing arc of the select region (e.g., of paths in the select region) is determined to be low based on a threshold value.

For some embodiments, the timing-aware tradeoff model is configured to evaluate an individual transform by applying a minimum ratio (e.g., a minimum return-of-investment) of an improvement (e.g., of the local area) of the circuit design by the individual transform (e.g., local transform) in a first design characteristic for a degradation of the circuit design in a second design characteristic. For instance, the minimum ratio comprises a timing improvement (e.g., slack improvement) versus a degradation of power consumption or a timing improvement versus a degradation of area use. The minimum ratio can be determined (e.g., dynamically chosen or selected) based on a sigmoid curve that compares a slack-dependent threshold against a negative slack. For instance, the minimum ratio can be determined based on a sigmoid transition function defined as (Function 1):

$$f(s) = 0.5\left[1 - \tanh\left(\frac{s - s_{min}}{s_{width}}\right)\right],$$

where $s_{min}$ represents a minimum slack transition value, and where $s_{width}$ represents a slack transition width. For some embodiments, one or more parameters of the sigmoid transition function (e.g., $s_{min}$, $s_{width}$, etc.) are determined (e.g., tuned or defined by a user) based on one or more design goals for the circuit design. $s_{min}$ can determine (e.g., control) how demanding slack optimization should be, and $s_{width}$ can determine (e.g., control) a scale of the delay (e.g., of the select region) of the circuit design being transformed. More regarding the minimum ratio and the sigmoid curve is discussed with respect to FIG. 4.

In various embodiments, the timing-aware tradeoff model is configured to evaluate by evaluating a gain in timing optimization using the following formula (Formula 2):

$$(R_{min} - R_{max}) + R_{max} * f(s) > \frac{\text{Gain}}{-\Delta s},$$

where f(s) is a function (e.g., Function 1) defining a sigmoid curve for determining a ratio of an improvement of the circuit design by the individual transform in a first design characteristic for a degradation of the circuit design in a second design characteristic, where $R_{min}$ (e.g., $ROI_{min}$) is a minimum ratio, where $R_{max}$ (e.g., $ROI_{max}$) is a maximum ratio, where Cost represents an area cost or a power cost, and where $\Delta s$ represents a difference in slack after the individual transform and before the individual transform. $R_{min}$ and $R_{max}$ can represent min and max thresholds (e.g., min and max ROI thresholds) used in evaluating an individual transform. For some embodiments, one or more parameters of the formula (e.g., $R_{min}$, $R_{max}$, etc.) are determined (e.g., tuned or defined by a user) based on one or more design goals for the circuit design. Accordingly, the one or more parameters can be chosen separately for different optimization steps based on circuit design targets. For instance, the first design characteristic can comprise timing (e.g., slack), the second design characteristic can comprise power consumption or area usage, and the one or more parameters (e.g., $R_{min}$, $R_{max}$, $\Delta s$, etc.) of the formula (e.g., Formula 2) can be determined (e.g., defined or tuned) to cause improvement (e.g., optimization) of timing (e.g., slack) at the cost of degrading (e.g., increasing) power consumption or area usage.

In response to operation 208 determining that the application of the individual transform on the region is not acceptable, operation 208 can proceed with determining whether application of another (e.g., a next) individual transform (in the set of transforms) on the select region is acceptable. When no additional individual transforms in the set of transforms need evaluation, the method 200 can return to operation 206 to evaluate another (e.g., a next) class of transforms if it exists.

In response to operation 208 determining that the application of the individual transform on the region is acceptable, operation 210 commits (e.g., binds) the individual transform to the select region to generate an altered region that replaces the select region in the circuit design. By committing the individual transform, operation 210 actually applies or otherwise leaves the changes to the circuit design by the individual transform in place. Prior to the commit at operation 210, the modifications made to the select region of the circuit design by the individual transform can be removed or reversed as if the individual transform were never applied to the select region. Additionally, after the individual transform is committed to the circuit design, a subsequent transform applied to the circuit design can modify at least some portion of the select region previously modified by the individual transform. Thereafter, the method 200 can return to operation 208 and determine whether application of another (e.g., a next) individual transform (in the set of transforms) on the select region is acceptable. Additionally, when no additional individual transforms in the set of transforms need evaluation, the method 200 can return to operation 206 to evaluate another (e.g., a next) class of transforms if it exists.

FIG. 3 is a flowchart illustrating an example method 300 for modifying a circuit design based on timing tradeoff, according to some embodiments. In particular, the method 300 can represent an example of an implementation of the method 200 of FIG. 2.

Referring now to FIG. 3, a local region of a circuit design is selected for optimization at operation 302, and a selection of transforms from a chosen class of transforms is determined at operation 304. Thereafter, a (first) current transform, from the selection of transforms, is selected at operation 308, and the method 300 proceeds to operation 310. At operation 310, acceptance (or rejection) of the current transform is evaluated (e.g., determined) based on a timing tradeoff as described herein (e.g., using the timing-aware tradeoff model). In response to the current transform being accepted at operation 310, the method 300 proceeds to operation 312, where the current transform is committed to the local region of the circuit design (e.g., changes to the local region by the current transform are applied or otherwise left in place). In response to the current transform not being accepted at operation 310, the method 300 returns to operation 308, where a next current transform, from the selection of transforms, is selected. In the event that operation 308 determines a next current transform does not exist or remain (e.g., all the transforms from the selection of transforms have been evaluated), the method 300 proceeds to operation 314.

At operation 314, a new class of transforms (if another exists) is selected or chosen, and the method 300 returns to operation 304, where a new selection of transforms is determined (e.g., selected) from the new class of transforms. If no additional classes of transforms exist or remain for evaluation, the method 300 proceeds to operation 316, where the method 300 finishes or ends.

Figure 4:
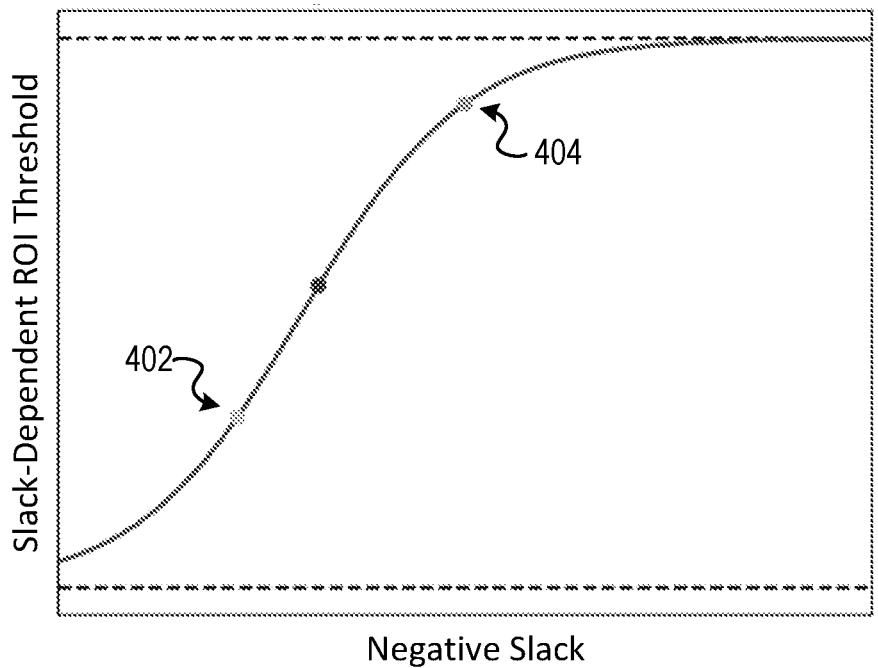
FIG. 4 provides diagrams illustrating implementations of an example timing-aware tradeoff model, according to some embodiments.
Figure 4:
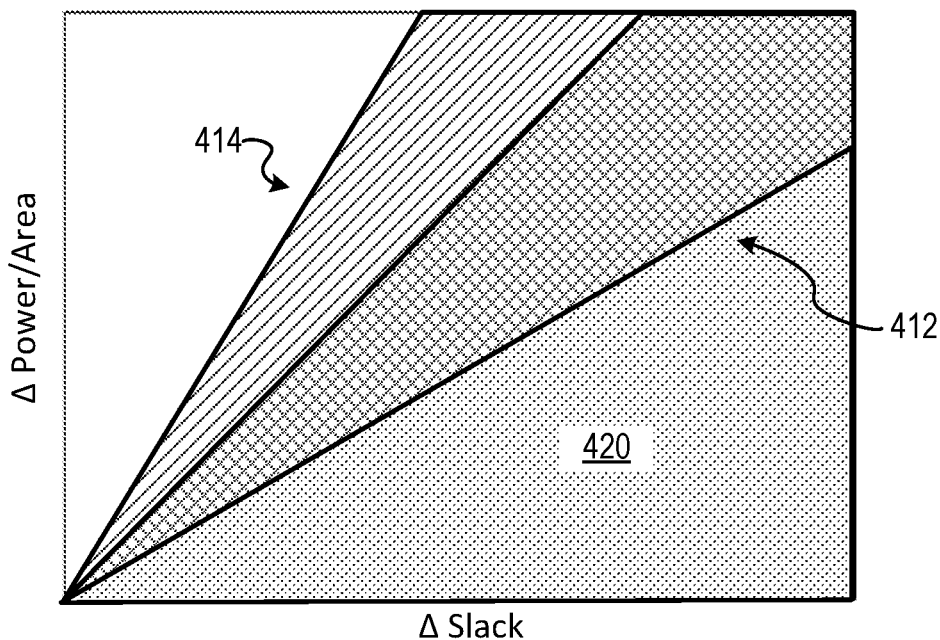

FIG. 4 provides diagrams illustrating implementations of an example timing-aware tradeoff model, according to some embodiments. Specifically, FIG. 4 includes a graph 400 illustrating a transition curve implemented by the example timing-aware tradeoff model, where the transition curve compares a slack-dependent ROI threshold to negative slack values. For some embodiments, the transition curve is defined by Function 1. In particular, the transition curve shows a transition from a very strict (or less permissive) filter for accepting an individual transform at small negative slack (e.g., at point 402), to a very generous (or more permissive) filter for accepting an individual transform at a large negative slack (e.g., at point 404).

FIG. 4 also includes a graph 410 that illustrates transform acceptance decisions by the example timing-aware tradeoff model. The graph 410 illustrates a comparison of relative delay improvements (e.g., represented by Δ slack) to relative area or power improvements (e.g., represented by Δ power/area). Line 414 corresponds to the ratio between change in slack value and change in power consumption/area usage value for point 404 of the transition curve, and line 412 corresponds to the ratio between change in slack value and change in power consumption/area usage value for point 402 of the transition curve. In graph 410, area 420 represents changes (e.g., improvement) in slack value versus changes (e.g., degradation) in power consumption values or area usage values that are acceptable based on the example timing-aware tradeoff model; transforms that result in such improvement versus degradation would be accepted by some embodiments based on the example timing-aware tradeoff model.

Figure 5:
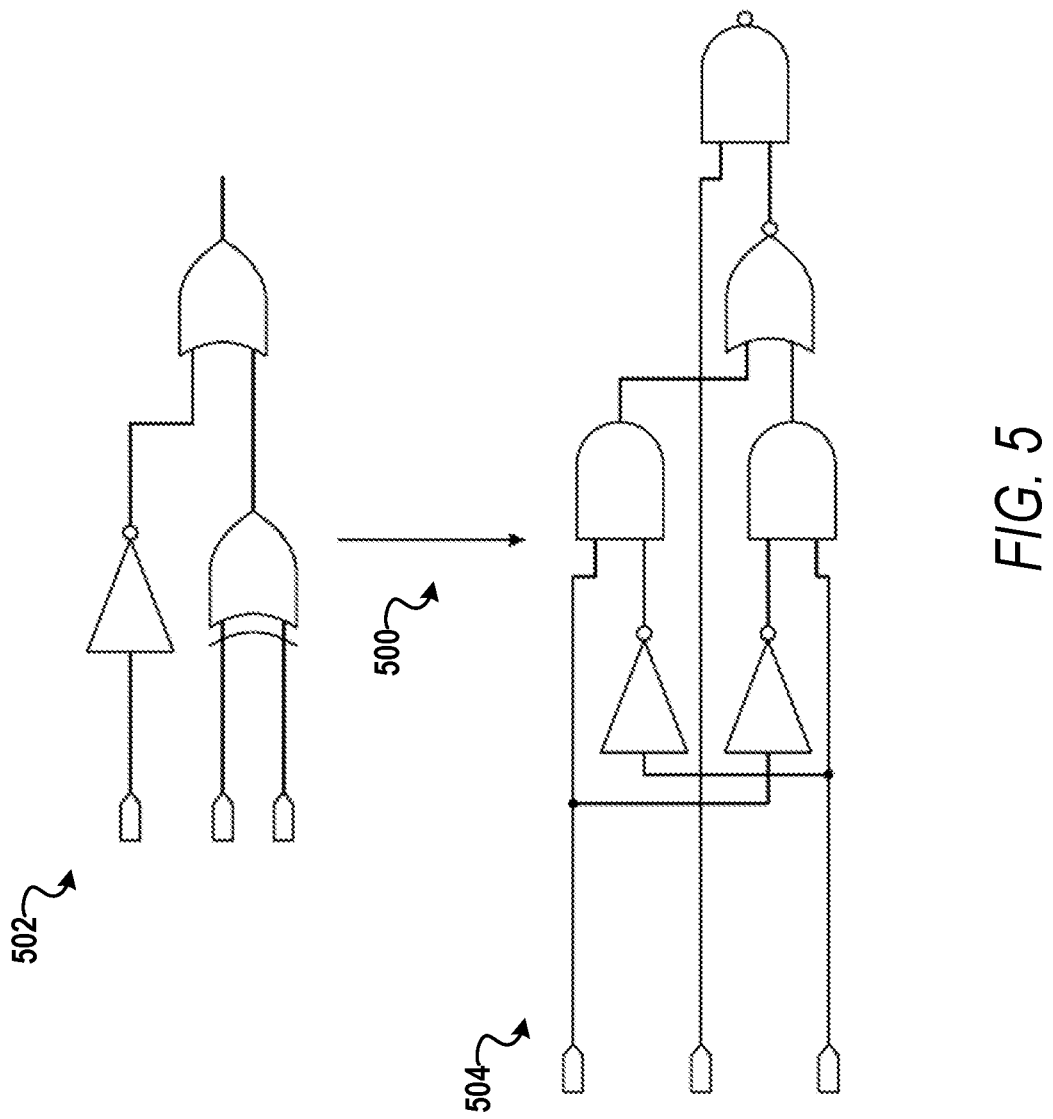
FIGS. 5 and 6 illustrate example of transforms applied on example local areas of a circuit design based on an example timing-aware tradeoff model, according to some embodiments.

FIG. 5 illustrates an example of a transform 500 applied on an example local area 502 of a circuit design based on an example timing-aware tradeoff model, according to some embodiments. As shown, the transform 500 results in an altered/modified area 504, which if accepted based on the example timing-aware tradeoff model, would be committed to the circuit design. For some embodiments, the example timing-aware tradeoff model is used to determine whether the transform 500 is desirable based on the value of the local slack as well as the improvement to the local slack of the local area 502. For instance, the transform 500 can result in an improvement in slack (e.g., by +1.1 ps) and increase of area usage (e.g., +3 literals). An embodiment can use the example timing-aware tradeoff model to determine acceptance of the transform 500 in response to determining that the improved slack is worth degrading the area usage (e.g., by +3 literals), especially if the timing of the local area has a highly constrained timing arc (e.g., has a slack of −100 ps, which may be regarded as particularly bad) and needs slack improvement. However, if the local area has a less constrained timing arc (e.g., −5 ps of slack, which may be regarded as acceptable), an embodiment can use the example timing-aware tradeoff model to determine rejection of the transform 500 and possibly look for (e.g., evaluate) another transform.

Figure 6:
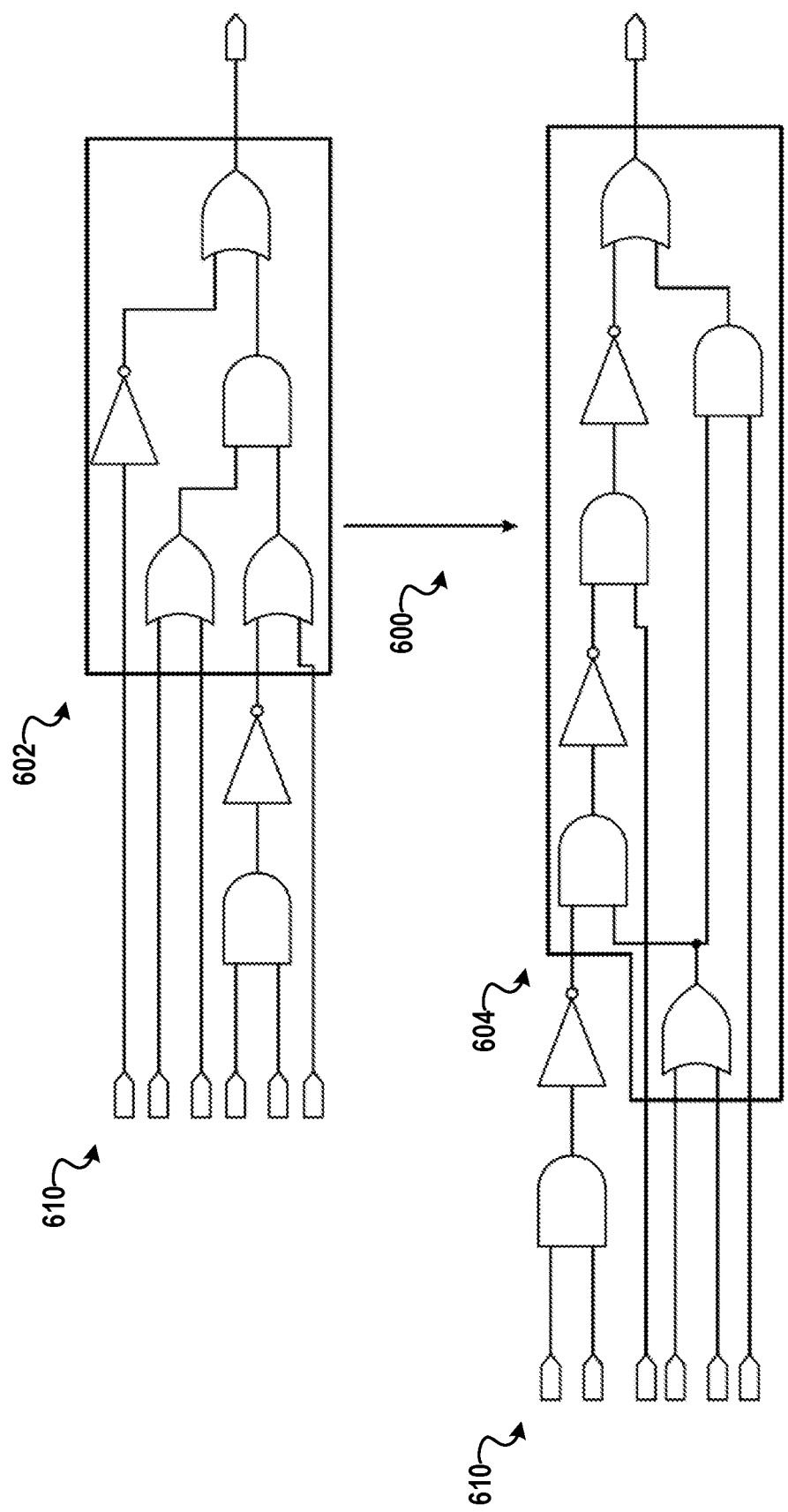

FIG. 6 illustrates an example of a transform 600 applied on an example local area 602 of a circuit design 610 based on an example timing-aware tradeoff model, according to some embodiments. As shown, the transform 600 results in an altered/modified area 604, which if accepted based on the example timing-aware tradeoff model, would be committed to the circuit design 610 and would replace the local area 602. As with FIG. 5, the example timing-aware tradeoff model can be used to determine whether the transform 600 is desirable based on the value of the local slack as well as the improvement to the local slack of the local area 602. For instance, the transform 600 can result in an improvement in slack (e.g., by +0.9 ps) and increase of area usage (e.g., +3 literals). An embodiment can use the example timing-aware tradeoff model to determine acceptance of the transform 600 in response to determining that the improved slack is worth degrading the area usage (e.g., by +3 literals), especially if the timing of the local area has a highly constrained timing arc (e.g., has a slack of −100 ps, which may be regarded as particularly bad) and needs slack improvement. However, if the local area has a less constrained timing arc (e.g., −5ps of slack, which may be regarded as acceptable), an embodiment can use the example timing-aware tradeoff model to determine rejection of the transform 500 and possibly look for (e.g., evaluate) another transform.

Figure 7:
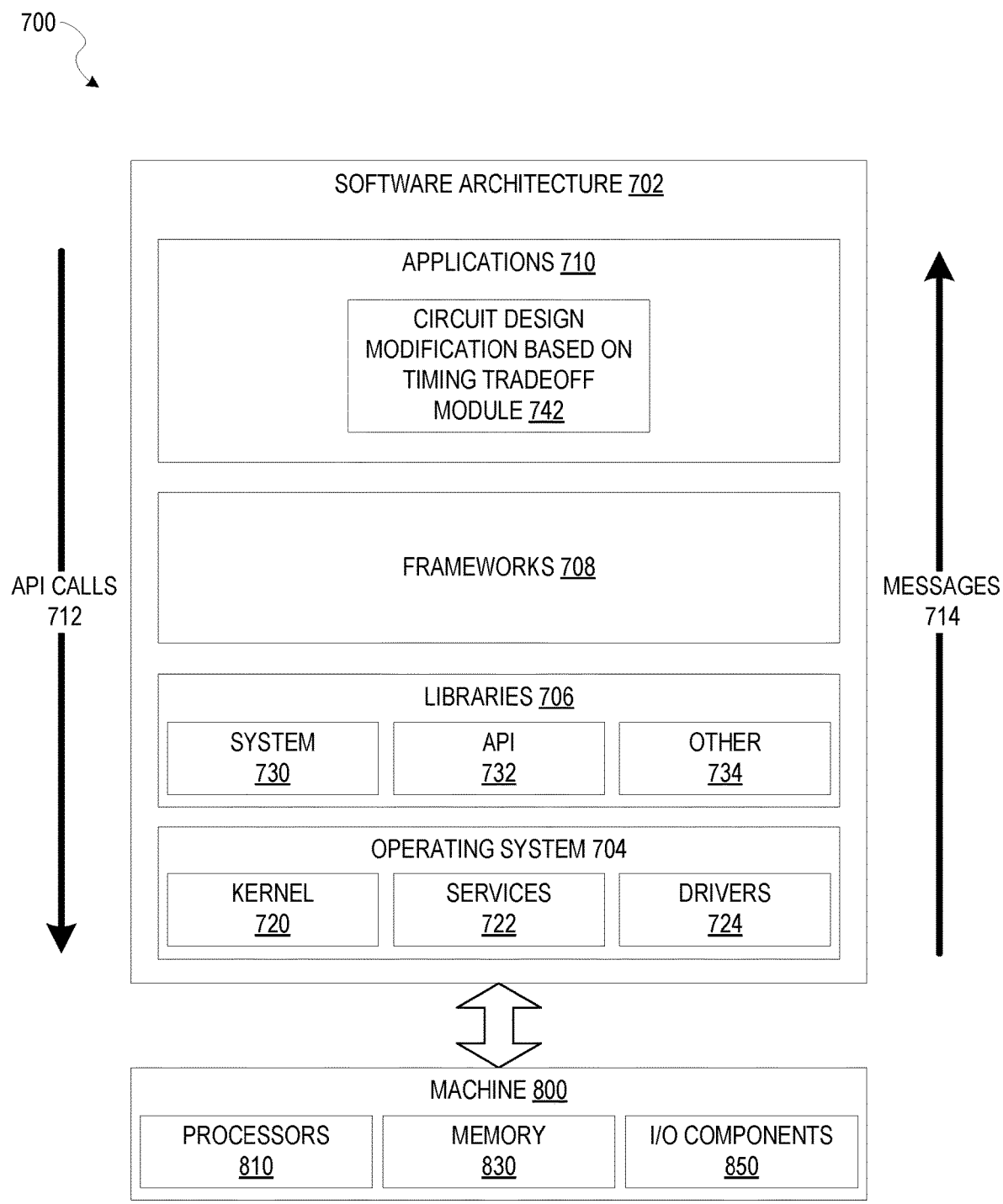
FIG. 7 is a block diagram illustrating an example of a software architecture that may be operating on an EDA computing device and may be used with methods for modifying a circuit design based on timing tradeoff, according to some embodiments.

FIG. 7 is a block diagram 700 illustrating an example of a software architecture 702 that may be operating on an EDA computer and may be used with methods for using timing tradeoff (e.g., a timing-aware tradeoff model) to modify a circuit design, according to some example embodiments. The software architecture 702 can be used as an EDA computing device to implement any of the methods described above.

FIG. 7 is merely a non-limiting example of a software architecture 702, and it will be appreciated that many other architectures can be implemented to facilitate the functionality described herein. In various embodiments, the software architecture 702 is implemented by hardware such as a machine 800 of FIG. 8 that includes processors 810 (e.g., hardware processors), memory 830, and I/O components 850. In this example, the software architecture 702 can be conceptualized as a stack of layers where each layer may provide a particular functionality. For example, the software architecture 702 includes layers such as an operating system 704, libraries 706, software frameworks 708, and applications 710. Operationally, the applications 710 invoke application programming interface (API) calls 712 through the software stack and receive messages 714 in response to the API calls 712, consistent with some embodiments. In various embodiments, any client device, any server computer of a server system, or any other device described herein may operate using elements of the software architecture 702. An EDA computing device described herein may additionally be implemented using aspects of the software architecture 702, with the software architecture 702 adapted for using timing tradeoff to modify a circuit design in any manner described herein.

In one embodiment, an EDA application of the applications 710 enables and facilitates use of timing tradeoff to modify a circuit design according to embodiments described herein using various modules within the software architecture 702. For example, in one embodiment, an EDA computing device similar to the machine 800 includes the memory 830 and the one or more processors 810. The processors 810 also implement a circuit design modification based on time tradeoff module 742 (hereafter, circuit design modification module 742) for using timing tradeoff to modify a circuit design in accordance with various embodiments described herein.

In various other embodiments, rather than being implemented as modules of the one or more applications 710, the circuit design modification module 742 may be implemented using elements of the libraries 706, the operating system 704, or the software frameworks 708.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 such as libraries of blocks for use in an EDA environment or other libraries that can provide functions such as memory allocation functions, string manipulation functions, mathematic functions, and the like. In addition, the libraries 706 can include API libraries 732 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 may also include other libraries 734.

The software frameworks 708 provide a high-level common infrastructure that can be utilized by the applications 710, according to some embodiments. For example, the software frameworks 708 provide various graphical user interface (GUI) functions, high-level resource management, high-level location services, and so forth. The software frameworks 708 can provide a broad spectrum of other APIs that can be utilized by the applications 710, some of which may be specific to a particular operating system 704 or platform. In various embodiments, the systems, methods, devices, and instructions described herein may use various files, macros, libraries, and other elements of an EDA design environment to implement usage of timing tradeoff to modify a circuit design as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 702, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 800 including processors 810), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 800, but deployed across a number of machines 800. In some example embodiments, the processors 810 or processor-implemented modules are located in a single geographic location (e.g., within a home environment, an office environment, or a server farm). In other example embodiments, the processors or processor-implemented modules are distributed across a number of geographic locations.

Figure 8:
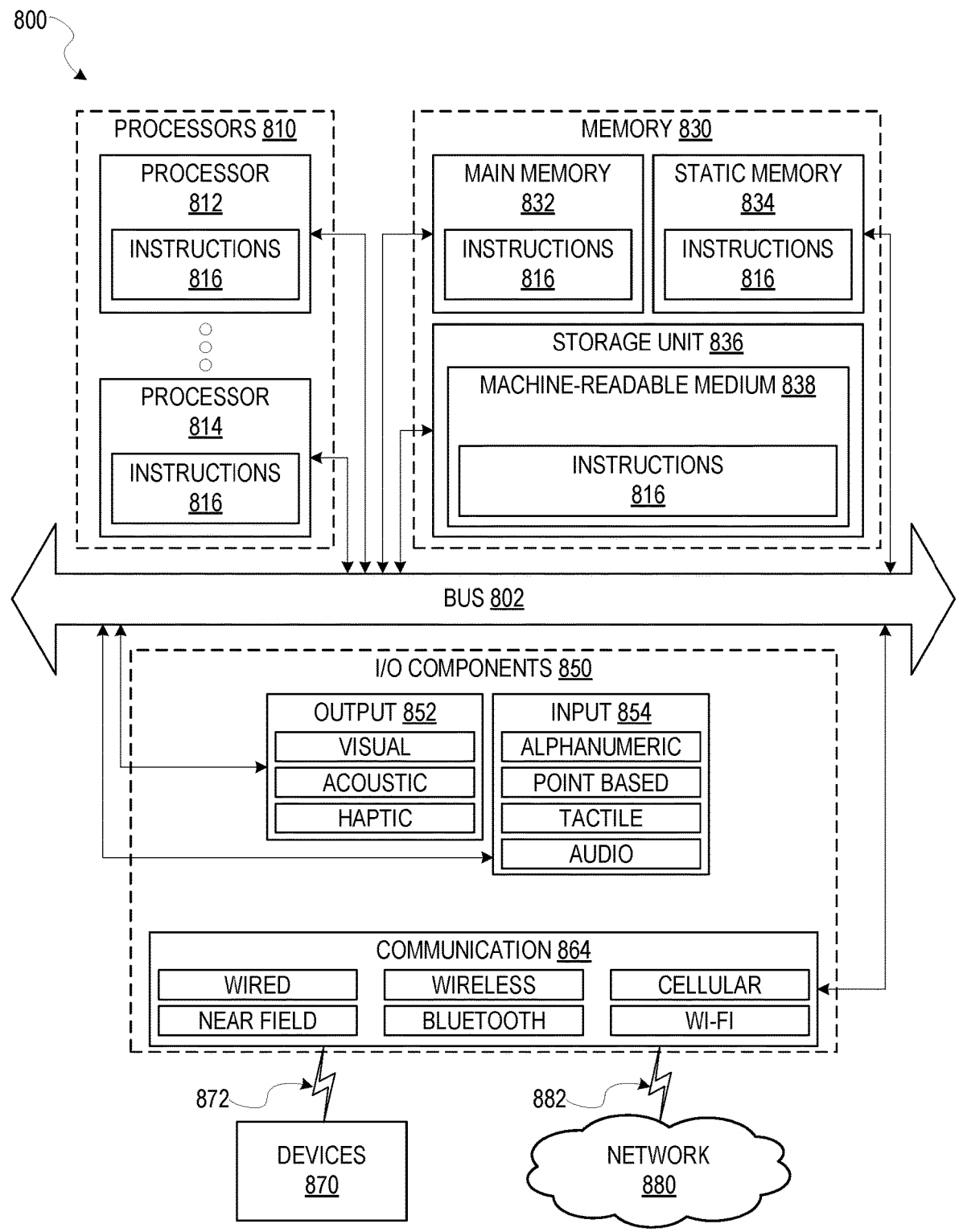
FIG. 8 is a diagram representing a machine in the form of a computer system within which a set of instructions are executed, causing the machine to perform any one or more of the methods discussed herein, according to some example embodiments.

FIG. 8 is a diagrammatic representation of the machine 800 in the form of a computer system within which a set of instructions may be executed for causing the machine 800 to perform any one or more of the methodologies discussed herein, according to an example embodiment. FIG. 8 shows components of the machine 800, which is, according to some embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein can be executed. In alternative embodiments, the machine 800 operates as a standalone device or can be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

In various embodiments, the machine 800 comprises processors 810, memory 830, and input/output (I/O) components 850, which can be configured to communicate with each other via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 812 and a processor 814 that may execute the instructions 816. The term "processor" is intended to include multi-core processors 810 that may comprise two or more independent processors 812, 814 (also referred to as "cores") that can execute the instructions 816 contemporaneously. Although FIG. 8 shows multiple processors 810, the machine 800 may include a single processor 812 with a single core, a single processor 812 with multiple cores (e.g., a multi-core processor 812), multiple processors 810 with a single core, multiple processors 810 with multiple cores, or any combination thereof.

The memory 830 comprises a main memory 832, a static memory 834, and a storage unit 836 accessible to the processors 810 via the bus 802, according to some embodiments. The storage unit 836 can include a machine-readable medium 838 on which are stored the instructions 816 embodying any one or more of the methodologies or functions described herein. The instructions 816 can also reside, completely or at least partially, within the main memory 832, within the static memory 834, within at least one of the processors 810 (e.g., within the processor's cache memory), or any suitable combination thereof, during execution thereof by the machine 800. Accordingly, in various embodiments, the main memory 832, the static memory 834, and the processors 810 are considered machine-readable media 838.

As used herein, the term "memory" refers to a machine-readable medium 838 able to store data temporarily or permanently and may be taken to include, but not be limited to, random-access memory (RAM), read-only memory (ROM), buffer memory, flash memory, and cache memory. While the machine-readable medium 838 is shown, in an example embodiment, to be a single medium, the term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., the instructions 816) for execution by a machine (e.g., the machine 800), such that the instructions, when executed by one or more processors of the machine (e.g., the processors 810), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 include a wide variety of components to receive input, provide output, produce output, transmit information, exchange information, capture measurements, and so on. In general, it will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 include output components 852 and input components 854. The output components 852 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or another suitable device to interface with the network 880. In further examples, the communication components 864 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 870 may be another machine or any of a wide variety of peripheral devices (e.g., a peripheral device coupled via a USB).

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling.

Furthermore, the machine-readable medium 838 is non-transitory (in other words, not having any transitory signals) in that it does not embody a propagating signal. However, labeling the machine-readable medium 838 "non-transitory" should not be construed to mean that the machine-readable medium 838 is incapable of movement; the machine-readable medium 838 should be considered as being transportable from one physical location to another. Additionally, since the machine-readable medium 838 is tangible, the machine-readable medium 838 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A non-transitory computer-readable medium comprising instructions that, when executed by a hardware processor of a device, cause the device to perform operations comprising:

accessing data that describes a netlist for a circuit design;

determining a select region of the circuit design for a transformation configured to alter a logic of the select region, the select region corresponding to a subset of the netlist;

determining, from a class of transforms, a set of transforms for the select region; and for an individual transform in the set of transforms:

determining, based on a timing-aware tradeoff model, whether application of the individual transform on the select region is acceptable, the timing-aware tradeoff model being configured to evaluate transforms based on a constrained timing arc of the select region; and in response to determining that the application of the individual transform on the region is acceptable, committing the individual transform to the select region to generate an altered region that replaces the select region in the circuit design.

2. The non-transitory computer-readable medium of claim 1, wherein the timing-aware tradeoff model is configured to evaluate transforms based on the constrained timing arc of the select region by:

prioritizing transforms that improve slack in the select region when the constrained timing arc is determined to be high based on a threshold value.

3. The non-transitory computer-readable medium of claim 1, wherein the timing-aware tradeoff model is configured to evaluate transforms based on the constrained timing arc of the select region by:

prioritizing transforms that lower power consumption by the select region when the constrained timing arc is determined to be low based on a threshold value.

4. The non-transitory computer-readable medium of claim 1, wherein the timing-aware tradeoff model is configured to evaluate transforms based on the constrained timing arc of the select region by:

prioritizing transforms that reduce area of the circuit design occupied by the select region when the constrained timing arc is determined to be low based on a threshold value.

5. The non-transitory computer-readable medium of claim 1, wherein the timing-aware tradeoff model is configured to evaluate transforms based on the constrained timing arc of the select region by:

applying a minimum ratio of an improvement of the circuit design by the individual transform in a first design characteristic for a degradation of the circuit design in a second design characteristic.

6. The non-transitory computer-readable medium of claim 5, wherein the minimum ratio is determined based on a sigmoid curve that compares a slack-dependent threshold against a negative slack.

7. The non-transitory computer-readable medium of claim 5, wherein the minimum ratio is determined based on a sigmoid transition function defined as:

$$f(s) = 0.5\left[1 - \tanh\left(\frac{s - s_{min}}{s_{width}}\right)\right],$$

where $s_{min}$ represents a minimum slack transition value, and where $s_{width}$ represents a slack transition width.

8. The non-transitory computer-readable medium of claim 1, wherein the timing-aware tradeoff model is configured to evaluate transforms based on the constrained timing arc of the select region by:

evaluating a gain in timing optimization using a following formula:

$$(R_{min} - R_{max}) * f(s) + R_{max} > \frac{\Delta s}{\text{Cost}},$$

where f(s) is a function defining a sigmoid curve for determining a ratio of an improvement of the circuit design by the individual transform in a first design characteristic for a degradation of the circuit design in a second design characteristic, where $R_{min}$ is a minimum ratio, where $R_{max}$ is a maximum ratio, where Cost represents an area cost or a power cost, and where $\Delta s$ represents a difference in slack after the individual transform and before the individual transform.

9. The non-transitory computer-readable medium of claim 1, wherein the timing-aware tradeoff model is configured to evaluate transforms based on the constrained timing arc of the select region by:

evaluating a gain in power optimization or an area optimization using a following formula:

$$(R_{min} - R_{max}) + R_{max} * f(s) > \frac{\text{Gain}}{-\Delta s},$$

where f(s) is a function defining a sigmoid curve for determining a ratio of an improvement of the circuit design by the individual transform in a first design characteristic for a degradation of the circuit design in a second design characteristic, where $R_{min}$ is a minimum ratio, where $R_{max}$ is a maximum ratio, where Gain represents an area gain or a power gain, and where $\Delta s$ represents a difference in slack after the individual transform and before the individual transform.

10. A device comprising:
a memory storing instructions; and
a hardware processor communicatively coupled to the memory and configured by the instructions to perform operations comprising:
  accessing data that describes a netlist for a circuit design;
  determining a select region of the circuit design for a transformation configured to alter a logic of the select region, the select region corresponding to a subset of the netlist;
  determining, from a class of transforms, a set of transforms for the select region; and
  for an individual transform in the set of transforms:
    determining, based on a timing-aware tradeoff model, whether application of the individual transform on the select region is acceptable, the timing-aware tradeoff model being configured to evaluate transforms based on a constrained timing arc of the select region; and
    in response to determining that the application of the individual transform on the region is acceptable, committing the individual transform to the select region to generate an altered region that replaces the select region in the circuit design.

11. The device of claim 10, wherein the timing-aware tradeoff model is configured to evaluate transforms based on the constrained timing arc of the select region by:
prioritizing transforms that improve slack in the select region when the constrained timing arc is determined to be high based on a threshold value.

12. The device of claim 10, wherein the timing-aware tradeoff model is configured to evaluate transforms based on the constrained timing arc of the select region by:
prioritizing transforms that lower power consumption by the select region when the constrained timing arc is determined to be low based on a threshold value.

13. The device of claim 10, wherein the timing-aware tradeoff model is configured to evaluate transforms based on the constrained timing arc of the select region by:
prioritizing transforms that reduce area of the circuit design occupied by the select region when the constrained timing arc is determined to be low based on a threshold value.

14. The device of claim 10, wherein the timing-aware tradeoff model is configured to evaluate transforms based on the constrained timing arc of the select region by:
applying a minimum ratio of an improvement of the circuit design by the individual transform in a first design characteristic for a degradation of the circuit design in a second design characteristic.

15. The device of claim 14, wherein the minimum ratio is determined based on a sigmoid curve that compares a slack-dependent threshold against a negative slack.

16. The device of claim 14, wherein the minimum ratio is determined based on a sigmoid transition function defined as:

$$f(s) = 0.5\left[1 - \tanh\left(\frac{s - s_{min}}{s_{width}}\right)\right],$$

where $s_{min}$ represents a minimum slack transition value, and where $s_{width}$ represents a slack transition width.

17. The device of claim 10, wherein the timing-aware tradeoff model is configured to evaluate transforms based on the constrained timing arc of the select region by:

evaluating a gain in timing optimization using a following formula:

$$(R_{min} - R_{max}) * f(s) + R_{max} > \frac{\Delta s}{\text{Cost}},$$

where f(s) is a function defining a sigmoid curve for determining a ratio of an improvement of the circuit design by the individual transform in a first design characteristic for a degradation of the circuit design in a second design characteristic, where $R_{min}$ is a minimum ratio, where $R_{max}$ is a maximum ratio, where Cost represents an area cost or a power cost, and where $\Delta s$ represents a difference in slack after the individual transform and before the individual transform.

18. The device of claim 10, wherein the timing-aware tradeoff model is configured to evaluate transforms based on the constrained timing arc of the select region by:

evaluating a gain in power optimization or an area optimization using a following formula:

$$(R_{min} - R_{max}) + R_{max} * f(s) > \frac{\text{Gain}}{-\Delta s},$$

where f(s) is a function defining a sigmoid curve for determining a ratio of an improvement of the circuit design by the individual transform in a first design characteristic for a degradation of the circuit design in a second design characteristic, where $R_{min}$ is a minimum ratio, where $R_{max}$ is a maximum ratio, where Gain represents an area gain or a power gain, and where $\Delta s$ represents a difference in slack after the individual transform and before the individual transform.

19. A method comprising:
accessing, by a hardware processor, data that describes a netlist for a circuit design;
determining, by the hardware processor, a select region of the circuit design for a transformation configured to alter a logic of the select region, the select region corresponding to a subset of the netlist;

determining, by the hardware processor and from a class of transforms, a set of transforms for the select region; and for an individual transform in the set of transforms:
determining, by the hardware processor and based on a timing-aware tradeoff model, whether application of the individual transform on the select region is acceptable, the timing-aware tradeoff model being configured to evaluate transforms based on a constrained timing arc of the select region; and in response to determining that the application of the individual transform on the region is acceptable, committing, by the hardware processor, the individual transform to the select region to generate an altered region that replaces the select region in the circuit design.

20. The method of claim 19, wherein the timing-aware tradeoff model is configured to evaluate transforms based on the constrained timing arc of the select region by performing at least one of:

prioritizing transforms that improve slack in the select region when the constrained timing arc is determined to be high based on a threshold value;

prioritizing transforms that lower power consumption by the select region when the constrained timing arc is determined to be low based on the threshold value; or prioritizing transforms that reduce area of the circuit design occupied by the select region when the constrained timing arc is determined to be low based on the threshold value.

* * * * *